United States Patent Office 3,322,105
Patented May 30, 1967

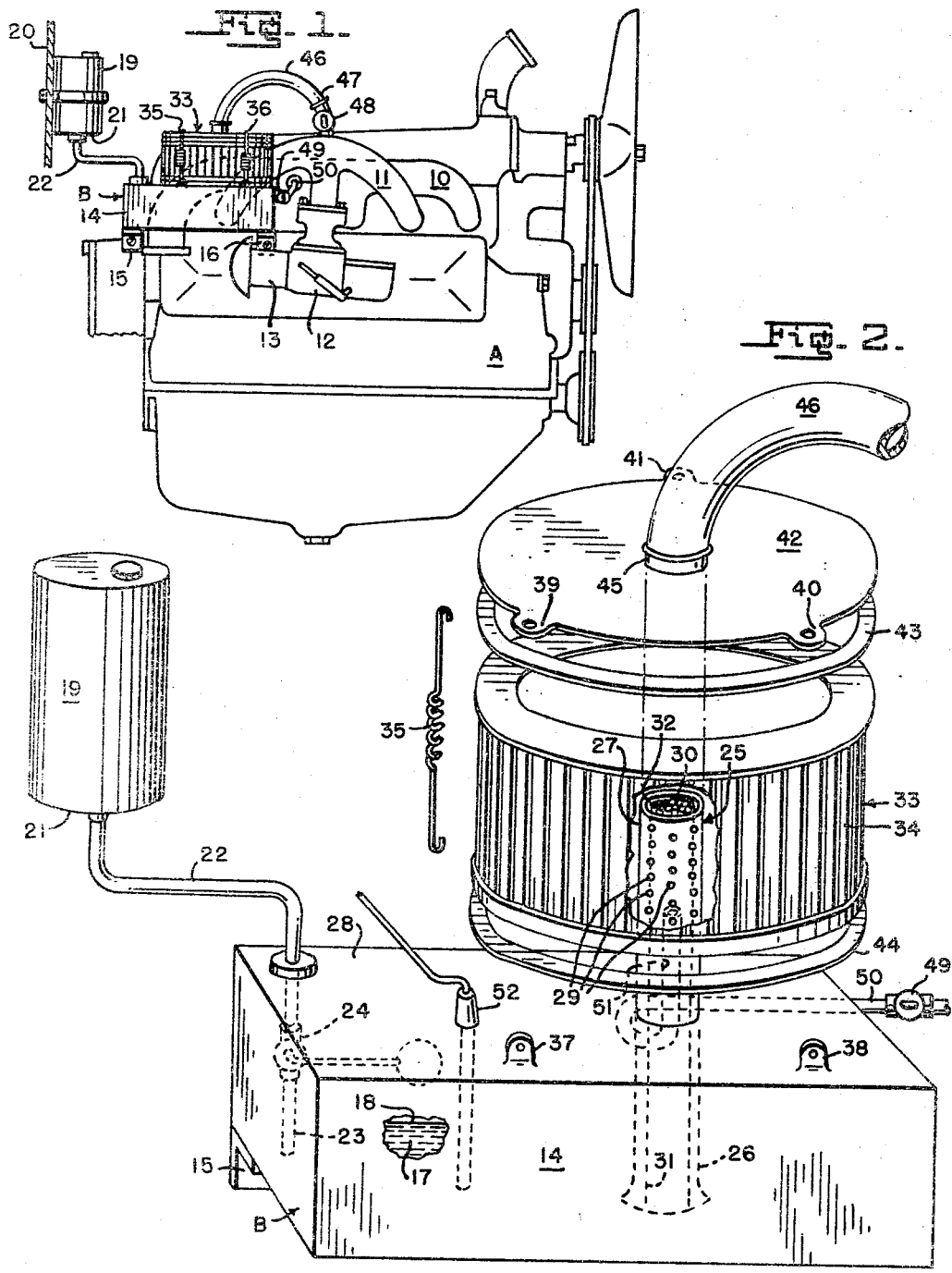

3,322,105
EQUIPMENT FOR AUGMENTING THE FUEL SUPPLIED TO INTERNAL COMBUSTION ENGINES
Archibald McIntyre, 297 9th Ave. NW., Swift Current, Saskatchewan, Canada
Filed Aug. 9, 1965, Ser. No. 478,484
4 Claims. (Cl. 123—127)

This invention relates to improvements in equipment for augmenting the fuel supplied to an internal combustion engine and an important object of the invention is to provide means supplying an internal combustion engine with warmed and moistened air to the end that additional oxygen is made available for complete combustion of the gaseous fuel intake of the engine.

Another object of the invention is the provision of equipment of the character just described which may be used to supply alcohol fumes as a supplement to the main gaseous fuel intake of the internal combustion engine.

Another object of the invention is to provide equipment of the character just described which is suitable for cold climates in that an anti-freeze solution of alcohol may be used in the equipment instead of plain water.

A still further object of the invention is the provision of equipment of the character just described including means for filtering atmosphereic air prior to its admission into the engine.

A still further object of the invention is to provide equipment of the character just described wherein the alcohol and water solution may be heated electrically and/or be utilizing a portion of the hot exhaust gas from the engine.

Other objects and advantages of the invention will become apparent during the course of the following detailed description taken in connection with the accompanying drawing forming a part of this specification and in which drawing FIG. 1 is a side elevational view of an internal combustion engine provided with my equipment for augmenting its gaseous fuel supply.

FIG. 2 is a partialy exploded view in perspective with portions broken away of my equipment for supplementing, enriching and/or augmenting the main fuel supply of the engine shown in FIG. 1.

In the drawing, which for the purpose of illustration shows only a preferred embodiment of the invention and wherein similar reference characters denote corresponding parts throughout the views, the letter A generally designates a conventional internal combustion engine provided with an exhaust manifold 10 and an intake manifold 11 supplied with a gaseous fuel by means of a conventional carburator 12 having an air inlet pipe 13.

The letter B generally designates my equipment for supplementing, enriching and/or augmenting the fuel intake of the engine A. This equipment B includes a container 14 which may be rectangular and somewhat shallow as shown, and it is attachable to the upper side of the engine A as by brackets 15, 16 so as to partake of the heat of the engine A. Means is provided for supplying the container 14 with alcohol-water solution 17 to a predetermined level 18 in the container 14 and this means comprises a can 19 for the alcohol-water solution 17 which may be secured at a higher level than the container 14 as by attachment to a wall 20 which may be the engine compartment rear wall of an automotive vehicle (not shown). At its lower end 21 the can 19 is provided with a pipe 22 leading to and extending downwardly into the container 14 and terminating in a lower end portion 23 provided with a float valve 24 arranged to cut off gravity flow of the alcohol-water solution 17 into the container 14 at a predetermined level 18.

The container 14 is provided with a riser pipe 25 having a lower end portion 26 disposed in the alcohol-water solution 17, and an upper end portion 27 projecting upwardly from the container top 28 and provided with vertically and circumferentially spaced perforations 29 for the admittance of atmospheric air. Disposed in the riser pipe 25 is a wick 30 having its lower end 31 immersed in the alcohol-water solution 17 and its upper end 32 coextensive with the perforated upper end portion 27 of the riser pipe 25. Disposed in coaxial alignment with the perforated upper end portion 27 of the riser pipe 25 is an annular filter element 33 which may be formed of pleated porous sheet material 34 as shown and which may be secured in position on the container top 28 by springs 35, 36 having ends hooked into lugs 37, 38 on the container top 28 and lugs 39–41 around the periphery of a circular top plate 42 forming part of the filter element 33. Upper and lower annular gaskets 43, 44 are preferably provided to seal the filter unit 33 against ingress of air other than through the pleated sheet material 34. Connected to the top of the filter element 33 and forming an extension of the perforated upper end portion 27 of the riser pipe 25 is one end 45 of a hose 46 preferably formed of flexible material and having its other end 47 connected to the engine intake manifold 11 as by a shutoff valve 48 as shown in FIG. 1. Connected to the engine exhaust manifold 10 as by a shutoff valve 49 is a small diameter tube 50 leading into the container 14 and thence into the riser pipe 25 and terminating in an upwardly directed end portion 51 within the perforated upper end portion 27 of the riser pipe 25. The container 14 may be provided with an electrical heating element 52 as shown.

In the operation of the equipment B, the alcohol-water solution 17 flows by gravity from the can 19 into the container 14 under the control of the float valve 24 which automatically cuts off the flow upon filling the container 14 to a predetermined level 18. Preferably after the engine A has become hot through operation, the shutoff valves 48, 49 are opened at which time a portion of the engine exhaust gases from the manifold 10 will be supplied through the tube 50 into the riser pipe 25 and the upward flow of the warm exhaust gas will induce upward flow of fumes of the alcohol-water solution 17 from the container 14 through the wick 30. Also atmospheric air will be induced to pass into the filter element 33 and thence through the riser pipe perforations 29 and upwardly through the hose 46 at the top of the filter element 33. As a result of this combined action, there will pass into the engine intake manifold 11 a warm mixture of atmospheric air containing oxygen, the heated exhaust gas and the fumes of the alcohol-water solution 17 to the end that the conventional gaseous fuel intake mixture of the engine A will be supplemented, enriched and/or augmented by the named gaseous components furnished by the equipment B. The additional oxygen present in the admitted atmospheric air will tend to insure a more complete and efficient combustion of the conventional gaseous fuel intake of the engine A.

Various changes may be made in the form of invention herein shown and described without departing from the spirit of the invention or the scope of the following claims.

I claim:
1. Equipment for supplying auxiliary fuel to an internal combustion engine having a gaseous fuel intake passageway and an exhaust gas passageway, said equipment comprising a container for a vaporizable liquid, means for heating said container, a riser pipe having a perforated portion projecting upwardly from said container, a wick disposed in said riser pipe and having an end portion immersed in said liquid, means conducting exhaust gas from said exhaust gas passageway into said riser piper, and a conduit connecting the projecting portion of said riser pipe to the gaseous fuel intake passageway, said perforated portion of the riser pipe admitting atmospheric air thereby to supply additional oxygen to said intake passageway.

2. The combination with an internal combustion engine having a main gaseous fuel supply system including a gaseous fuel intake passageway and having an exhaust gas passageway, of equipment for supplying auxiliary fuel to said engine comprising a container for vaporizable liquid fuel solution, means for heating said container, means supplying and maintaining said solution to a level in said container, a pipe rising from said container and having its upper end portion provided with perforations for the admittance of atmospheric air including oxygen, a wick in said pipe having a lower end portion immersed in said solution, a conduit carrying exhaust gas from said exhaust gas passageway into said riser pipe, and a conduit connecting said riser pipe to said gaseous fuel intake passageway.

3. For use with an internal combustion engine having a main gaseous fuel supply system including a gaseous fuel intake passageway and having an exhaust gas passageway, equipment for supplying additional oxygen to said engine comprising a container, means heating said container, means supplying and maintaining an aqueous solution to a predetermined level in said container, a riser pipe projecting upwardly from said container and provided with perforations admitting atmospheric air including oxygen, a wick in said pipe having a lower end portion in said solution, means including a shut-off valve conducting exhaust from said exhaust passageway into said riser pipe, and means including a shut-off valve connecting said riser pipe at its upper end portion to said gaseous fuel intake passageway.

4. Equipment for supplementing the gaseous fuel normally supplied to an internal combustion engine, including a gaseous fuel intake pipe and an exhaust gas duct, said equipment comprising a liquid container attachable to the engine, means for supplying and maintaining a predetermined level of a vaporizable liquid solution in said container, means for heating the solution in said container, a riser pipe having a lower end portion disposed in said container and terminating below the level of said solution, and an upper end portion projecting above said container, said upper end portion being provided with perforations admitting atmospheric air into said riser pipe, an air filter surrounding the upper end portion of said riser pipe, a wick disposed in said riser pipe having a lower end portion extending below said solution level and an upper end portion coextensive with the perforated upper end portion of said riser pipe, a valve-controlled tube connectible into said engine exhaust gas duct to supply hot exhaust gas to said riser pipe, and a valve-controlled hose forming an extension of the upper end portion of said riser pipe and connectible into said engine fuel intake pipe.

References Cited
UNITED STATES PATENTS

| | | | |
|---|---|---|---|
| 1,309,114 | 7/1919 | Black | 123—119 |
| 1,319,633 | 11/1919 | Waite | 123—119 |
| 1,365,651 | 1/1921 | Beaumont et al. | |
| 1,566,332 | 12/1925 | Lilly. | |
| 1,623,053 | 4/1927 | Howard et al. | 123—127 |
| 1,632,285 | 6/1927 | Georgi | 123—119 |
| 1,750,342 | 3/1930 | Bailey | 123—119 |
| 2,606,537 | 8/1952 | Baumheckel | 123—127 X |
| 2,749,223 | 6/1956 | Harrington | 123—133 X |

MARK NEWMAN, *Primary Examiner.*

A. L. SMITH, *Examiner.*